United States Patent [19]

Dubois

[11] Patent Number: 4,863,091
[45] Date of Patent: Sep. 5, 1989

[54] METHOD AND APPARATUS FOR PRODUCING CONTINUOUS LENGTHS OF COILABLE TUBING

[75] Inventor: Jon D. Dubois, Houston, Tex.

[73] Assignee: Quality Tubing, Inc., Houston, Tex.

[21] Appl. No.: 29,171

[22] Filed: Mar. 18, 1987

[51] Int. Cl.$^4$ .................. B23K 37/00; B23K 31/00
[52] U.S. Cl. ............................ 228/147; 228/5.7; 29/33 D; 219/59.1
[58] Field of Search .................. 29/33 B, 33 D; 219/59.1, 62; 228/5.7, 147, 231

[56] References Cited

U.S. PATENT DOCUMENTS

| | | | |
|---|---|---|---|
| 1,940,939 | 12/1933 | Coryell | 80/60 |
| 2,214,618 | 9/1940 | Kenyon et al. | 80/31.1 |
| 2,285,209 | 6/1942 | Katz | 29/188 |
| 2,567,020 | 9/1951 | Kueter | 219/6 |
| 2,959,849 | 11/1960 | Rubin | 29/33 D |
| 3,279,050 | 10/1966 | Simich | 29/480 |
| 3,535,484 | 10/1970 | Snow et al. | 228/231 |
| 3,835,681 | 9/1974 | Shumaker | 228/5.7 |
| 3,912,151 | 10/1975 | Martin | 228/171 |
| 3,915,368 | 10/1975 | Ulmer | 228/5.7 |
| 4,062,504 | 12/1977 | Kitazawa | 242/55 |
| 4,063,058 | 12/1977 | Gross | 219/62 |
| 4,309,887 | 1/1982 | Judd | 72/280 |
| 4,552,299 | 11/1985 | Sendzimir | 228/5.7 |
| 4,612,984 | 9/1986 | Crawford | 166/77 |
| 4,706,871 | 11/1987 | Kajiwara et al. | 228/5.7 |

FOREIGN PATENT DOCUMENTS

| | | | |
|---|---|---|---|
| 3034792 | 4/1982 | Fed. Rep. of Germany | 29/33 D |
| 0590033 | 1/1978 | U.S.S.R. | 219/59.1 |
| 659900 | 10/1951 | United Kingdom . | |
| 940528 | 10/1963 | United Kingdom . | |
| 1047181 | 11/1966 | United Kingdom . | |
| 1290932 | 9/1972 | United Kingdom . | |

OTHER PUBLICATIONS

Catalog from Guild International, Inc. entitled "The World's Safest, Most Compact Semi-Automatic Shear-Welder". See p. 4.
Catalog from Guild International, Inc. entitled "Guild Shearwelders for Welding".

*Primary Examiner*—Kurt Rowan
*Attorney, Agent, or Firm*—Arnold, White & Durkee

[57] ABSTRACT

A system for making a long length of seam-welded tubing from shorter lengths of flat metal strip which are spliced end-to-end and formed into tubular form and seam-welded. Adjoining ends of two successive lengths of the strip are trimmed at supplementary angles, one of which is an acute angle. The trimmed ends are abutted and welded, preferably with weldment extending beyond each such end. All surfaces of the weld are finished to match the dimensions of the strip. The tubing, along with the welded joints, is heat treated as the tubing is formed to produce a product substantially free of internal surface roughness along the splice welds.

18 Claims, 3 Drawing Sheets

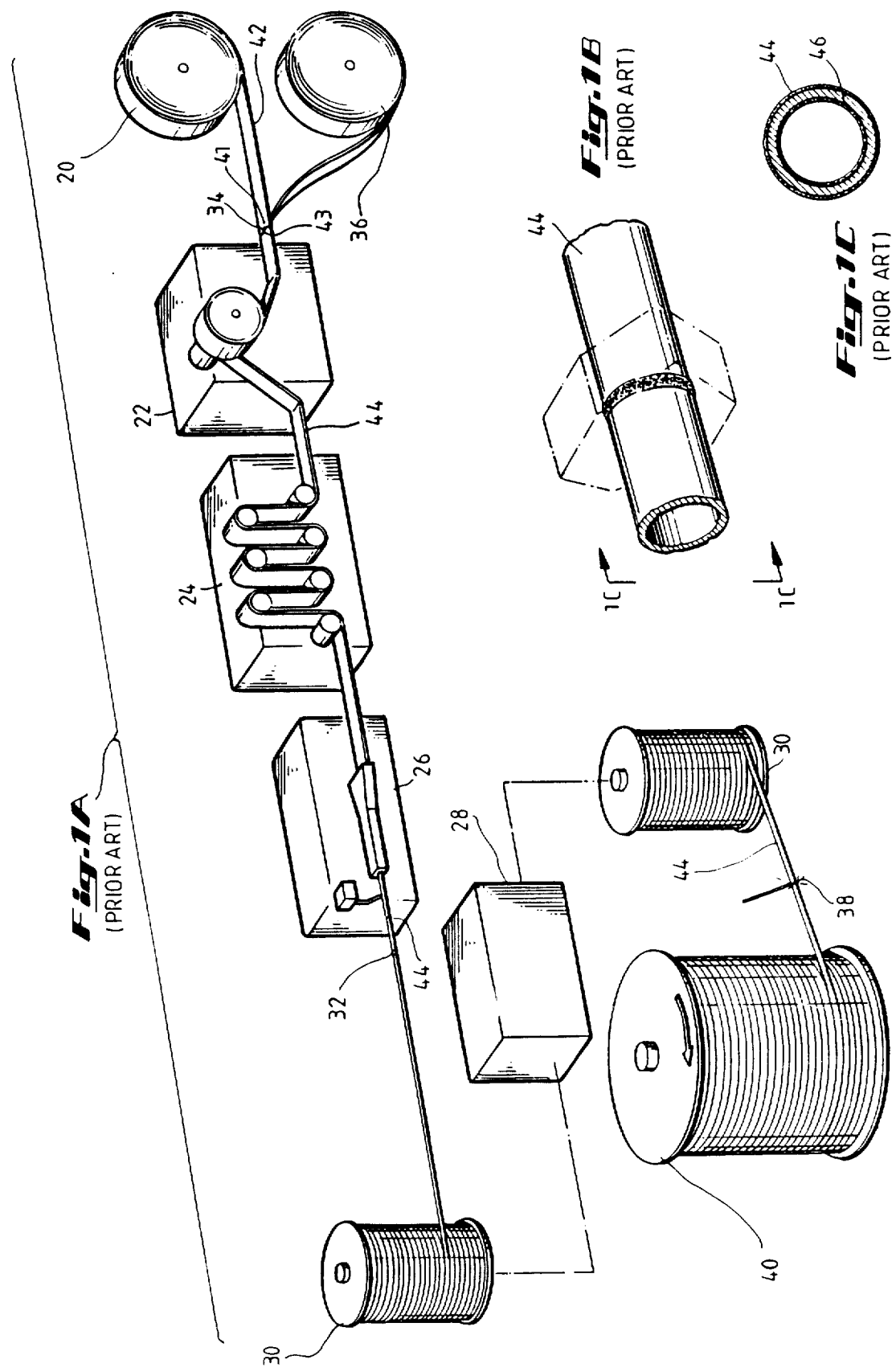

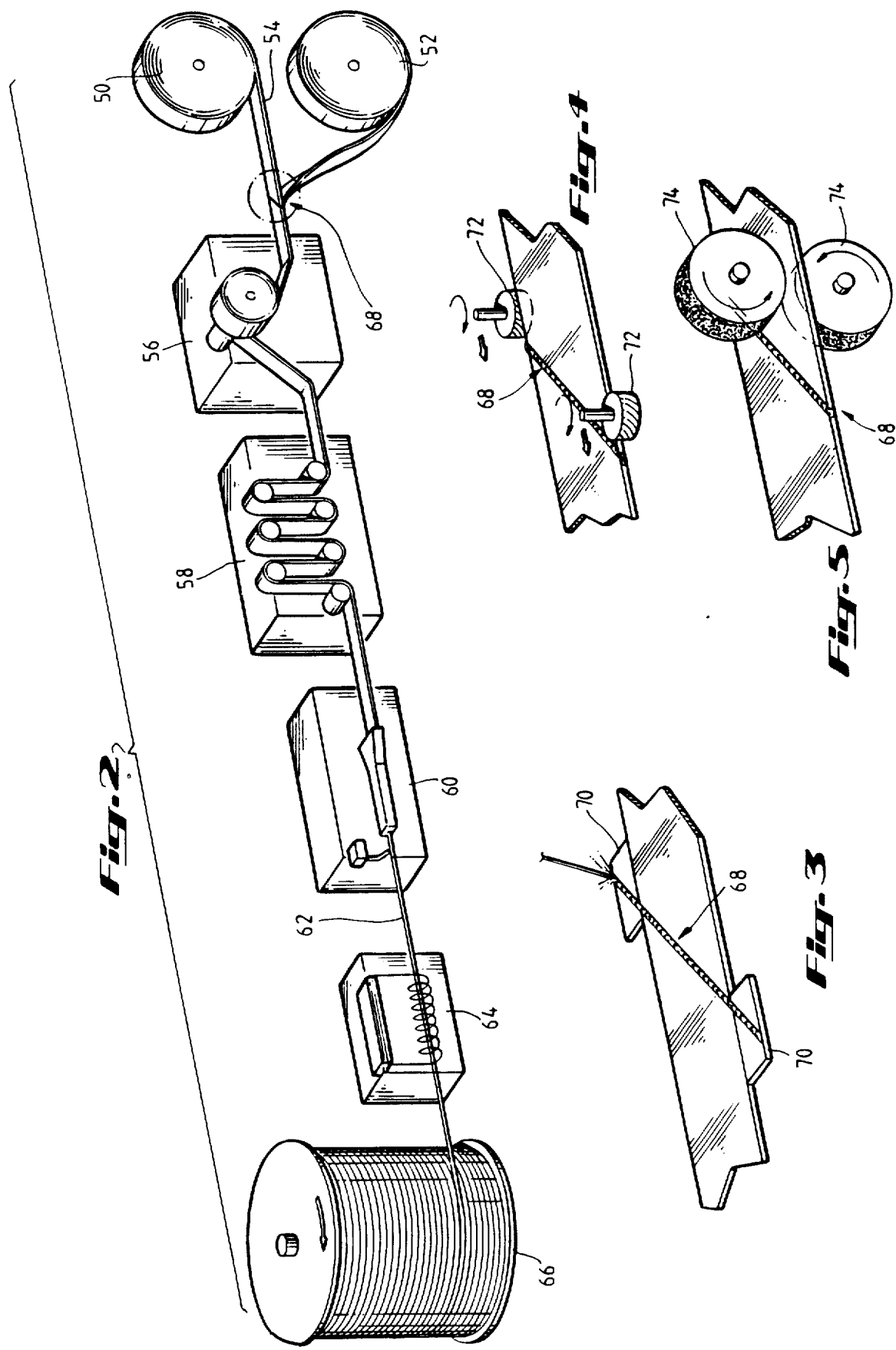

METHOD AND APPARATUS FOR PRODUCING CONTINUOUS LENGTHS OF COILABLE TUBING

BACKGROUND OF THE INVENTION

The present invention relates generally to the production of coilable metallic tubing, and in particular to the production of continuous lengths of carbon or stainless steel coilable tubing in various lengths up to, and exceeding, 20,000 feet.

Coilable metallic tubing is produced from flat metal stock which is typically shipped in 4 feet widths and in lengths of 4,000 feet. This stock is then sliced into widths approximately 4 inches wide to form "strips" which are 4000 feet in length. These strips are unspooled into an accumulator. An accumulator is a device which periodically quickly draws flat metal strips from a supply coil into one end while slowly and continuously feeding the metal stock out an opposite end. From this opposite end the metal strip is relatively slowly but continuously fed into a tube forming apparatus now known in the art.

As noted, a flat strip is preferably periodically drawn from the supply coil into the accumulator at a relatively high rate of speed for a short time. This periodic accumulation of flat strip from the supply coil results in periods of from 9 to 13 minutes of inactivity while the strip is slowly and steadily fed from the output end of the accumulator. This period of inactivity provides sufficient time to replace the supply coil spool which is depleted with another full supply coil. The new supply coil may be brought into position, and the leading end of the new flat strip may be tack welded to the trailing end of the strip from the depleted supply coil. This prior art arrangement enables the tube forming apparatus to operate continuously without interruption due to supply coil replacement. In addition, the cumbersome and time consuming rethreading of the tube forming apparatus is eliminated.

Currently, steel mills have the capability of producing master coils of flat metal strip of up to 4,000 feet in length. In the past, although a trailing end of the strip from a depleted supply coil was tack welded to the leading end of an additional supply coil in order to keep the tube forming machinery in continuous operation, an inferior joint was formed every 4,000 feet. In the past, after tubing from one entire supply coil had been produced, the short section of tubing formed on both sides of the tack welded union of the two lengths of flat strip was cut out of the tubing string and discarded. The result has been that continuous lengths of only about 4,000 feet of coilable metallic tubing have been produced.

These 4,000 foot long lengths of coilable tubing string then have been transported to a furnace, heat treated, and placed in inventory. When a length of up to 20,000 feet of coilable metallic tubing has been required, ends of the individual 4,000 foot lengths of tube have been butt-welded together to form the required length of tubing.

Although providing a degree of satisfactory performance, these butt-welded joints have been the source of significant concern to persons skilled in this art. In some situations where coilable metallic tubing is required, and particularly in oil field applications, the tubing must be able to sustain very high pressure and repeated coiling and uncoiling stresses. Therefore, the butt-welds joining the individual 4,000 foot lengths of tubing must be of very high quality. In order to check the integrity of the butt-welds, each butt-welded connection is subjected to x-ray nondestructive testing procedures. However, because a butt-weld is a circumferential weld, each butt-welded joint must be x-rayed at an angle in order to avoid a shadowing effect whereby the front of the welded joint shadows the back of the joint. Further, because a butt-weld is a circumferential weld, the butt-welded joint must be x-rayed a number of times at slightly different rotational positions about the longitudinal axis of the tubing in order to compensate for the radial shadowing effect at opposed diagonal regions around the tube.

Butt-welding lengths of coiled tubing also may weaken the overall strength of the tubing string. When ends of two lengths of tubing are butt-welded together, the butt-welding operation creates a heat-affected zone in the tubing on each side of the weld. The tensile strength of the tubing string in these heat-affected zones will typically be 90% or less of the tensile strength of a typical section of the previously heat-treated tubing string. Further, the heat-affected zone on each side of the butt-weld is entirely circumferential, therefore creating two potentially weak zones, one on each side of each butt weld.

When the overall length of tubing string is spooled off of a large transport reel and inserted downhole into a well, and is then removed from the well and spooled back onto the reel, each butt joint experiences significant tensile forces and bending moments. In the past, the tubing has occasionally failed at a heat-affected zone adjacent the butt-weld.

Whereas known techniques facilitate the grinding away of excess weldment around the outside diameter of the butt-weld, the circumferential accumulation of weldment around the inside diameter of the butt-weld cannot as readily be removed. As a result, with prior techniques, a bead of weldment reduces the inside diameter of the tubing at the location of the butt-weld. This reduced diameter region may interrupt smooth flow inside the tubing and may interfere with the introduction of maintenance devices referred to as "pigs" which are pumped through the tubing or of measuring instruments which may be lowered by gravity through the tubing.

For example, coilable tubing is sometimes used to transport abrasive fluids at high pressures downhole into an oil well. When these fluids encounter the circumferential bead or ring of weldment built up around the inside diameter of the butt joint, a turbulence is formed down stream of the butt-weld. This turbulence may cause the abrasive fluids to abrade or cut through the wall of the tubing string from the inside, thereby causing tubing failure. Also, in the past, occasionally measuring instruments and pigs became lodged on the built up circumferential ring of weldment around the inside diameter of the butt-weld.

Thus, the combined tubing strings known in the prior art have demonstrated various disadvantages which heretofore have not been overcome.

SUMMARY OF THE INVENTION

The present invention addresses the problems associated with the prior art by providing an improved system for making seam welded tubing. The invention makes use of strips of flat metal stock, but it produces a product which avoids ring-type butt joints. The product has greatly reduced heat-affected areas as well as substantially smooth interior wall surfaces. The invention also makes it possible to fabricate a tubing string of up to 20,000 feet in length or more in a single pass operation, and in a fraction of the time normally required using known methods and apparatus. Further, the tubing of the invention has improved tensile and ultimate strength, and it may be x-rayed or otherwise nondestructively examined in a single simple step.

Like the methods of the prior art, the present invention starts with lengths of relatively narrow metal flat strip stock wound on supply coil spools. Further, as in the prior art, the lengths are successively drawn from the various supply coils and are joined end-to-end to form a composite strip which is fed through the tube forming apparatus. Unlike the prior art, however, the lengths are not joined together by tack - welds which are thereafter cut out and discarded. Instead, the trailing end of one length and the leading end of the next successive length are cut or trimmed at supplementary angles, one of which is an acute angle. The trimmed ends are then joined and welded together. The welded area is then treated to remove excess weldment so as to produce stock having smooth edges and flat surfaces. Suitable grinding machines or other machine tools may be employed as desired. It is important, however, that the dimensions of the welded area match the dimensions of the flat strip itself as closely as practicable, and preferably within a tolerance of 0.003 inch.

In welding the trimmed ends, it has been observed that the ends of the welds - i.e., at the edges of the joined strips - may be adversely affected by the welding process. In particular, there appears to be inadequate dissipation of heat at the edges of the joined strips with the result that small holes may be burned completely through the strip material or the weldment may not completely fill the space between the strips. If the weldment does not extend fully to the lateral edges of the joined strips or a small hole is already present in the strip, when the strip is formed into a tube, a hole or reduced wall thickness area may be created. This, of course, would result in tubing of unsatisfactory quality. It is therefore a preferred practice to temporarily extend the width of the edges of the flat strip at the ends of the welded joint. This can be conveniently done by placing a small piece or "wing" of the strip material along each side of the strip at the ends of the joint. The welding equipment, in effect, perceives the wing pieces as part of the strip itself. The wings serve as temporary heat sinks to dissipate the heat of welding and provide a continuing path for the weldment beyond the edges of the joined strips. The wings can be readily removed from the edges of the welded strip during a finishing process which also grinds away the 0.010 inch or so of weldment which projects beyond the edge of the joined strips after the wings have been removed. The extensions of weldment beyond the edges of the joined strips insure a full thickness of weldment at the lateral boundary of the joined strips. As a result, after welding and finishing of the welded joint, the width and thickness of the joined strips will conform to the same dimensional specifications as the remainder of the flat stock material.

Following the machining of the weld to the desired dimensions, the weld is "normalized". This is a procedure to raise the temperature of the weld and the heat-affected zone adjacent the weld to a level sufficient to return to a significant extent the grain structure to that of the remainder of the yet unformed strip. In addition, this normalizing process reduces the hardness of the weld zone and facilitates the formation of high quality tubing from the weld zone.

After two lengths of strip have been joined and welded as described above, the welded joint may be formed into seam welded tubing by suitable forming and welding. The welded tubing may be heat treated without there being any further severe thermal excursions which would be imposed by further welding.

The welded joint connecting two lengths of strip extends helically along only a short distance. In general, one end of each such helical joint will terminate at the welded seam, and the helical joint will not cross the welded seam between the two ends of the helical joint. This provides the advantageous result of improved strength across the welded area and an improved ability to withstand the repeated coiling and uncoiling stresses.

Another particular advantage of the product of the invention lies in the ease with which the product can be subjected to x-rays or other nondestructive technique for testing welds. In general, a single x-ray observation may be employed instead of the plurality of observations required by transverse, circular welded joints.

The tubing of the invention is especially useful and valuable in oil well operations which employ very long lengths of coilable tubing. The tubing is supplied in coil form on large spools, drums or the like. At a well site, the tubing is unreeled from a spool and run down the well to the desired depth. In those instances where the tubing is placed in the well on only a temporary basis, the tubing can be retrieved from the well simply by reeling it back onto its surface spool or drum.

A particular feature of the tubing of the invention when used in oil wells is its high quality welds, its very smooth inner wall surface, and its uniform strength. The absence of a weld bead at the splice joints inside the tubing is very desirable, since the resulting surface at the joints greatly reduces turbulence, reduces damage to logging tools and cables, improves heat treating, facilitates pigging, and reduces the incidence of pits and cavities.

The supplementary angles at the trimmed edges of the splice joints must include an acute angle in order to avoid a conventional transverse, circular joint. An acute angle of about 30 degrees is especially effective, but it is contemplated that angles ranging between about 20 degrees and about 60 degrees may also be employed. Angles relatively close to 90 degrees should be avoided.

The invention has particular application to steel tubing, but it is considered to be useful with other metal and alloy strip materials which are formed and welded into seam welded tubing, pipe and the like.

In the case of steel tubing made by the invention, it is contemplated that the tubing, once formed and welded, will be heat treated at suitable temperatures, generally greater than about 900 degrees F.

BRIEF DESCRIPTION OF THE DRAWINGS

FIG. 1A is a schematic representation of a known system for producing seam welded tubing.

FIG. 1B is an isometric view of a butt-welded joint connecting two lengths of tubing string according to the prior art.

FIG. 1C is a section end view of a butt-welded connection according to the prior art.

FIG. 1D is an isometric representation of a prior art butt-welded joint connection between two lengths of tubing string undergoing tension.

FIG. 2 is a schematic representation of a system for producing continuous seam welded tubing of indefinite length according to one preferred embodiment of the present invention.

FIG. 3 is an isometric view of an angular welded splice joint connecting the leading edge of flat metallic strip stock from a master coil to the trailing edge of a length of flat strip stock that has been drawn from a master coil.

FIG. 4 depicts machining the longitudinal edges of the welded angular joint so that no weldment extends beyond the lateral edges of the flat strip stock.

FIG. 5 depicts machining the top and bottom surfaces of the flat strip stock so that weldment will not protrude beyond the top and bottom surfaces of the strip stock.

DETAILED DESCRIPTION OF THE PREFERRED EMBODIMENT

Figure 6:
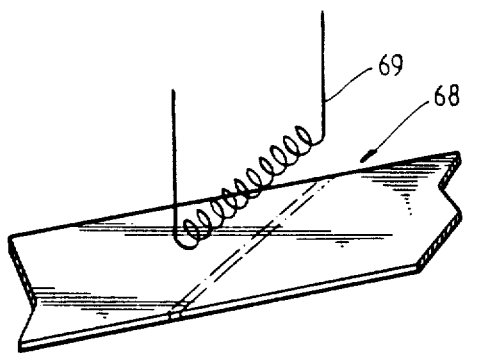
FIG. 6 depicts a machined angular joint according to the present invention which is being normalized by the application of heat to the weld.

Referring to FIG. 1A, a prior art system of producing a tubing string from flat steel metal strips is shown. In this system, a length of flat sheet metal strip stock 42 was previously coiled onto a supply coil 20. The leading edge 41 of the strip stock 42 has been typically tack welded (shown at 34) to the trailing edge 43 of the preceding length of strip stock 44 being processed into tubing. The leading edge 41 of the strip stock 42 has been tack welded to the trailing edge 43 of the preceding length of strip stock 44 so that the replacement supply coil 20 of strip stock 42 has been automatically threaded through an accumulator 22 and tube forming apparatus 26 and 24, so that the entire system would not have to be shut down and re-threaded. In order to form a length of tubing pursuant to the prior art process, an accumulator 22 has been used to draw in a length of strip stock 42 from a supply coil 20 periodically and at a high rate of speed while steadily and consistently feeding strip stock to the tube forming apparatus 26 and 24. Because of a variety of factors, steel mills today supply a maximum of about 4,000 foot lengths of flat stock on a single supply coil. Therefore, when the strip stock 42 on supply coil 20 has been depleted by accumulator 22 so that the trailing edge of the length of strip stock has been about to enter accumulator 22, a leading edge 41 of a replacement supply coil 36 has been hurried into position and tack welded to the trailing edge of the strip 42. This has enabled the new supply coil 36 to be automatically threaded through the accumulator 22 and the tube forming apparatus 26 and 24 without interrupting the tube forming process.

However, once the tube forming apparatus 26 and 24 has formed the flat stock 42 into a tubing string, the portion of tubing containing the tack weld (shown at 32) has had to be cut out due to its inferior quality.

Thereafter, a spool 30, typically holding 4,000 feet or so of the newly formed tubing, has been transported to a heat treatment facility 28 where the tubing has been heat treated. The individual spools 30 have then been transported into inventory. When it has become desirable to create a tubing string of, say, 15,000 feet, several spools 30 have been welded together and then consolidated onto a large reel 40. The tubing on the storage spools or transfer reels 30, have been joined or spliced together in an end-to-end relation by a butt-welding operation (shown at 38). It has been a common practice to join the tubing 44 contained on several storage spools 30 together by butt-welding in order to create long tubing strings of up to 20,000 feet in length.

However, butt-welding sections of tubing together to form an overall length of tubing string has proven to be not altogether satisfactory for a number of reasons. For example, butt-welded joints produce a circumferential build up of weldment around the inside diameter of the tubing string at the joint (see 46 in FIG. 1C). This build up or ridge 46 of weldment has caused a number of problems in the field.

Often times, tubing strings are used to transport logging instruments on relatively soft cable downhole in an oil well. Occasionally, these logging instruments have become hung up on the ridges 46 of weldment at the butt-welded joints. Moreover, the rough edges of the interior ridge of weldment have tended to abrade the exterior of the cable with the possibility of failure or reduced longevity of the cable.

The ridges 46 of weldment at the butt-welded joints 38 have also caused other problems with oil field tubing string. For example, abrasive fluids are often transported at a high pressure through the tubing string and into the oil well. When the flow of abrasive flow encounters a roughness such as weldment ridge 46, turbulence can occur immediately downstream of the ridge 46. This turbulent flow of abrasive fluid may be sufficient to abrade or cut through or weaken the wall of the tubing string and cause the tubing string to fail.

Further, as noted above, the tubing string 44 is initially spooled onto a large storage reel 40. Thereafter, the tubing string 44 is uncoiled and suspended in an oil well for a period of time and is removed from the oil well and spooled back onto the storage reel 40. During the course of coiling and uncoiling the tubing string onto and off of the storage reel 40, the tubing string may be subjected to large tensile forces and large applied moments. In that regard, during the welding operation, a heat-affected zone is created immediately on each side of the welded joint. This heat affected zone is created because of the high temperature generated by the butt-welding operation. The high temperature changes the material characteristics of the metal on each side of the butt-weld so that the heat-affected zone on either side of the butt-weld has a tensile strength which is approximately 90% of the tensile strength of the remainder of the tubing string. Because this heat-affected zone on either side of the butt-weld is completely circumferential, two circumferential zones of reduced tensile strength may be created in the tubing string on each side of each butt-weld. When such a tubing string is coiled, and uncoiled, and suspended in the well, the tensile forces and applied moments may be sufficient to cause the tubing string to fail at these heat-affected areas.

Referring next to FIG. 2, the apparatus shown there is similar in several respects to the apparatus shown in FIG. 1A. The apparatus includes master coils 50 and 52, followed by several processing stations, namely, an accumulator 56, a feed stock conditioner 58, a tube former 60, a heat treater 64 and a reel 66. The accumulator 56, like the accumulator in FIG. 1A, rapidly unwinds a length of strip stock from a supply coil such as coil 52 and temporarily houses this length in the accumulator. Concommittantly, the accumulator at a slower pace dispenses the housed strip to the tubing former 60. This differential action on the part of the accumulator provides an intermission of several minutes in which a second length of strip stock can be spliced onto the trailing end of the preceding length while the latter is still housed in the accumulator. A typical splice 68 is shown in FIG. 3. This splice, in accordance with the present invention, is formed by first cutting or trimming the strip ends to be spliced at supplementary angles, including one acute angle. A preferred acute angle has been found to be about 30 degrees. The opposite alternate interior angle would therefore be about 150 degrees. The leading end of the additional master coil is positioned with respect to the trailing end of the preceding coil so that the ends engage and abut.

FIGS. 3-6 show how the splice joint 68 is made. A small piece or wing 70 of flat strip, preferably of the same material as the strip being processed, is placed alongside each end of the joint 68. A welding tool is then passed along the joint 68 to weld the two lengths of strip together. The welding tool starts its welding run across one of the wings 70, then travels along the joint 68, and thence across the remaining wing 70. As explained earlier, the wings serve a valuable function as a heat sink and weld path which improves the quality of the welding of the joint. A relatively small bead of weldment generally extends beyond each end of the welded joint.

After the joint 68 has been welded, the wings 70 are removed. The joint is quickly machined or otherwise finished to remove any excess weldment, especially from the edges and from the flat surface of the strip stock which is to be the inside surface of the tubing. FIG. 4 shows how machine grinders 72 or other suitable machine tools may be used to smooth the longitudinal edges of the strip stock. As explained earlier, very close tolerances are required at those positions.

FIG. 5 shows how machine grinders 74 or other suitable machine tools may be used to smooth the two flat surfaces of the strip. Maintaining close tolerances during these smoothing operations is very significant to the quality of the finished coiled tubing. It is especially important, as noted earlier, that the welded joint on its inside surface—i.e., the inside surface of the tubing—be as smooth and continuous as the strip stock itself. The same is true for the longitudinal edges of the joint 68.

After the grinding or machining steps have been performed to bring the welded joint into conformance with dimensional tolerances, the weld is normalized as shown in FIG. 6. The normalizing of the weld may be achieved with a resistance heater, shown schematically at 69. Heat in the general range of 900 degrees to 1650 degrees F. may be applied to the weld for between 3 seconds and 5 minutes depending upon the metallurgical characteristics of the flat strip stock and the weldment.

When the strip stock reaches the tube former 60, it is shaped into tubular form with a seam running along its length. This seam is promptly welded, and the resulting seam welded tubing then passes immediately to the heat treater 64. From the heat treater the tubing is reeled on to a storage reel 66.

Figure 8:
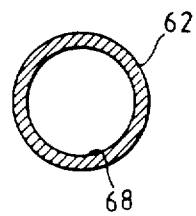
FIG. 8 is an end view of the section of tubing containing the angular welded joint according to the present invention.

It is an important feature of the invention that the process of the invention is a continuous one in which flat strip stock is formed into a coil of finished tubing a single pass. It is especially important, as shown in FIGS. 6 and 8, that the welded splice joints 68 blend in smoothly with the surfaces and metallurgy of the overall tubing. Referring specifically to FIG. 8, the interior surface of the weld 68 does not present any circumferential obstruction to flow within the tubing 62.

Figure 7:
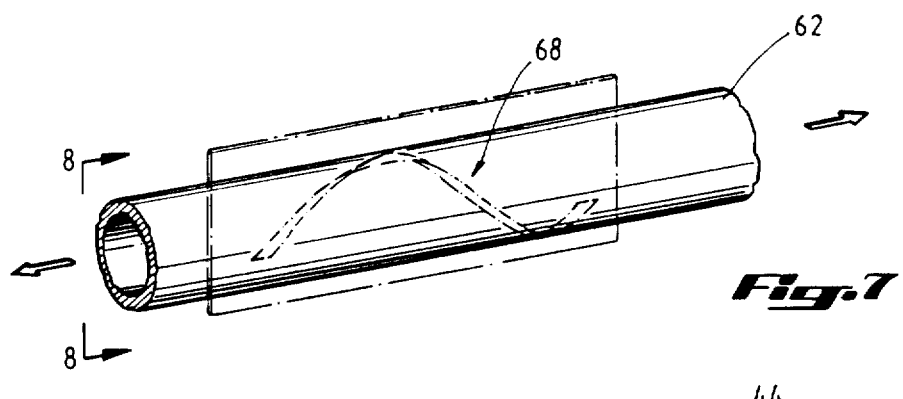
FIG. 7 is an isometric representation of a section of newly formed tubing containing the angular welded joint.
Figure 10:
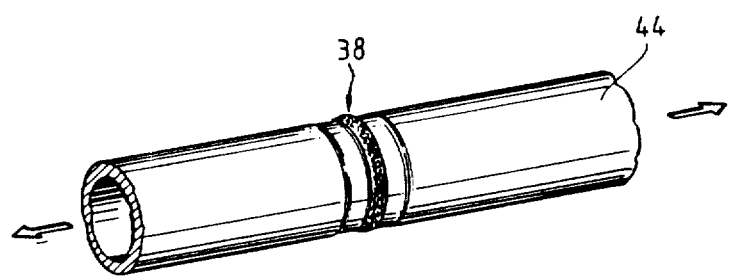

FIGS. 7 and 1D provide a striking comparison between the helical welded splice joints of the invention (FIG. 7) and the circular splice joints of the prior art. It is readily apparent from the two figures that the joint of the invention minimizes the undesirable characteristics of the two heat affected zones immediately adjacent each side of the joint 38 in FIG. 1D. As noted, the concentrated nature of these zones in the prior art make them more prone to problems than the joint 68 in FIG. 7. Any such zones in the tubing of FIG. 7 are distributed along the helical path of the joint 68 along with any potential weaknesses. As a result the joint of FIG. 7 is in all respects an improvement over the joint 38 in FIG. 1D.

What is claimed is:

1. A single pass method of making seam-welded tubing from at least two lengths of flat strip stock having substantially the same width and thickness and wherein each such length is reeled on a master coil, which comprises:

rapidly unreeling a first said length from its master coil to an accumulator coil while concomitantly feeding the leading end of the first said length to a tube forming step;

forming the first said length as it is fed from the accumulator coil into a tubular form having a longitudinal seam and welding the seam;

while at least a portion of the first length is still on the accumulator coil, performing the following steps (a) through (e);

(a) trimming the trailing end of the first length and the leading end of the second length at supplementary angles, including an acute angle;

(b) butting the trimmed ends together so that said ends engage to form an angular joint;

(c) abutting a separate section of strip stock alongside each end of the angular joint;

(d) welding the shielded angular joint and beyond each end of the joint;

(e) machining each end of the resulting weld to a level in the same plane as each side edge of the flat strip stock and machining each surface of the resulting weld to a level in the same plane as each flat surface of the flat strip stock to render the ends and surfaces smoothly continuous with the longitudinal edges and surfaces of the two lengths of strip stock to provide a weld which has substantially the identical thickness as the abutting lengths of flat strip stock and substantially the identical width as the abutting lengths of flat strip stock;

unreeling the second length from its master coil into the accumulator when all of the first length has been unreeled from the accumulator; and forming from the flat strip stock tubing having a constant inside diameter at the location of the weld to provide uninterrupted fluid flow in the vicinity of the angular joint when fluid is transported in the tubing.

2. In a method of making a seam-welded metal tubing from two lengths of flat metal strip stock wherein each length has a leading end and a trailing end, the method of splicing the two lengths which comprises:

trimming the trailing end of a first said length and the leading end of the second said length at supplementary angles including an acute angle side that the two trimmed ends can be fitted together;

butting said two trimmed ends together so that said ends engage to form a splice joint;

extending each end of the splice joint with a piece of strip stock abutting alongside the end;

positioning said two trimmed ends in abutting relation;

welding the splice joint; and machining each end of the welded joint to a level in the same plane as each side edge of the flat strip stock and machining each surface of the welded joint to a level in the same plane as each flat surface of the flat strip stock to blend smoothly with the longitudinal edges and surfaces of the two lengths of strip stock to provide a weld which has substantially the identical thickness as the abutting lengths of flat strip stock and substantially the identical width as the abutting lengths of flat strip stock and which will facilitate uninterrupted fluid flow in the seam-welded tubing in the vicinity of the splice when fluid is transported in the tubing.

3. The method of claim 2 in which the acute angle is between about 20 degrees and 60 degrees.

4. The method of claim 2 in which the acute angle is about 30 degrees.

5. In a method of forming seam-welded steel conduit from two lengths of steel flat stock which includes the step of joining the trailing end of a first such length to the leading end of a second such length, and the improvement which comprises:

trimming said trailing end and said leading end at supplementary angles, one of such angles being an acute angle;

butting the trimmed ends together so that said ends engage to form an angular joint; placing a separate piece of steel flat stock along each end of the angular joint;

welding the angular joint along and beyond each end of the angular joint onto the two pieces of steel flat stock; and removing weldment from the welded joint sufficient to place the level of the weld in the same plane as the flat surface of the flat strip stock which will become the inside of the conduit to facilitate uninterrupted fluid flow in the conduit in the vicinity of the angular joint when fluid is transported in the conduit.

6. In a method of forming welded metal tubing from separate lengths of metal flat strip stock wound on master coils wherein the lengths are intermittently and rapidly unwound from the coils in sequence into an accumulator from which the length in the accumulator at any given time is fed from the accumulator at a less rapid rate to a pipe former, an improved method which comprises:

conducting the following sequence of steps (a) through (e) during an intermission when the trailing end of a first length of strip is between its master coil and the accumulator:

(a) trimming said trailing end and the leading end of a second length of strip from another master coil at supplementary angles, one such angle being acute;

(b) butting the two trimmed ends together so that said ends engage to form an angular splice joint;

(c) fitting a separate piece of the metal strip alongside each end of the angular splice joint;

(d) running a welder in linear sequence across one of the strips then along the angular splice joint and across the other strip to form a weld which welds the splice joint and extends beyond each end of the joint; and (e) removing sufficient excess weldment from the welded joint splice to provide a welded joint which has substantially the identical thickness as the abutting lengths of flat strip stock and substantially the identical width as the abutting lengths of flat strip stock;

sequentially forming the first length of metal strip, the machined welded splice joint and the second length of metal strip into a tubular form having a longitudinal seam;

welding the longitudinal seam to form seam weld tubing having a constant inside diameter in the vicinity of the machine welded splice joint to facilitate uninterrupted fluid flow in the tubing in the vicinity of the joint when fluid is transmitted in the tubing;

heat treating the seam welded tubing including the machined splice joint; and reeling the heat treated tubing into coil form.

7. Apparatus to produce a continuous length of coilable metallic tubing having a constant outer diameter from a plurality of spools of flat metal stock, comprising:

an accumulator adopted to periodically and rapidly receive predetermined quantities of flat metal stock from a transport spool, while continuously and steadily playing out said flat metal stock at a predetermined rate;

a tubing former to form said flat metal stock into seamwelded tubing as it is played out of said accumulator;

a heat treater to continuously heat treat said tubing as it passes out of said tubing former;

a reel to spool said continuous string of heat treated metallic tubing;

a trimmer to provide an angular end surface to a trailing end of a flat metal stock drawn from a first master coil and a leading end of flat metal stock from a replacement master coil; said end surface being defined by a first angle defined between a first longitudinal side edge of said flat metal stock and its end which is less than 90°; said angular end of said trailing end of said flat metal stock from said first master coil being complementary and coactable with said leading end of said flat metal stock from said replacement master coil so as to form an angular joint between said flat metal stock from said first master coil and said flat metal stock from said replacement master coil;

a positioner to butt said trailing end of said first master coil against said leading end of said replacement coil;

a welder means to weld said angular joint between said trailing end of said first master coil and said leading end of said replacement master coil so that said weldment extends beyond said first longitudinal side edge and said second longitudinal side edge of said angular joint; and means to remove excess weldment protruding beyond the plane of said first longitudinal side edge, the plane of said second longitudinal side edge, and the planes both top and bottom surface of said angular joint, so that said flat metal stock from said first master coil and said replacement master coil are joined to provide a weld which has substantially the identical thickness as the lengths of flat metal strip stock and substantially the identical width as the lengths of flat metal stock to facilitate uninterrupted fluid flow in the conduit in the vicinity of the angular joint when fluid is transported in the tubing.

8. The apparatus according to claim 7, wherein said heat treater heats said tubing continuously passing through it to at least 900° F.

9. The apparatus according to claim 7, wherein said trimmer provides a first angle to said angular end surface of said trailing end of said first master coil and said leading end of said replacement coil that is approximately 30°.

10. The apparatus according to claim 7, wherein said means to remove excess weldment removes said weldment to within at least three thousandths of an inch tolerance.

11. A method of producing a continuous length of coilable metallic tubing from a plurality of master coils of flat metal stock, said tubing being characterized by a constant outer diameter, said method comprising the steps of:
periodically drawing a predetermined length of flat stock from a first master coil into an accumulator;
feeding said flat stock from said accumulator to a tube forming station at a constant rate;
forming said flat stock at said tube forming station into seam welded tubing as it is fed out of said accumulator;
heat treating said seam welded tubing as it passes from said tube forming station;
spooling said heat treated tubing onto a storage and transport reel after it has cooled;
positioning a leading end of flat stock from an additional master coil adjacent to a trailing end of flat stock from said first master coil after said accumulator has drawn said flat stock off of said first master coil so that a predetermined length of flat stock extends out of said accumulator;
trimming said leading end of said flat stock from said additional master coil and said trailing end of said flat stock from said first master coil so that coactable complementary angular ends are formed on said trailing end and said leading end;
positioning said leading end of said flat stock from said additional master coil into engagement with said trailing end of said flat stock from said first master coil so that said ends engage and abut to form an angular splice joint between said flat stock from said first master coil and said additional master coil;
welding said abutting angular ends together to form an angular welded joint;
machining said angular welded joint to remove substantially all excess weldment to a level in the same plane as each side edge of the flat stock and substantially all excess weldment to a level in the same plane as each flat surface of the flat stock to provide a weld which has substantially the identical thickness as the abutting lengths of flat stock and substantially the identical width as the abutting lengths of flat stock to facilitate uninterrupted fluid flow in the vicinity of the angular welded joint when fluid is transported in the tubing; and
periodically drawing a predetermined length of flat stock from said additional master coil into said accumulator, wherein said trimming, welding, and machining steps are performed between said periodic drawings of flat stock into said accumulator so that said tube forming, heat treating, cooling, and spooling steps are not interrupted.

12. The method according to claim 11, wherein said length of spooled heat treated tubing is at least 20,000 feet long.

13. The method according to claim 11, wherein the weldment joining said abutting angular ends of flat stock extends slightly beyond each longitudinal edge of said joined flat stock.

14. The method according to claim 13, wherein said machining removes said excess weldment to at least three thousandths of an inch tolerance.

15. The method according to claim 11, wherein said newly formed tubing is heated to at least 1300° F. in said heat treating step.

16. The method according to claim 11, wherein said positing, trimming, positioning, welding, and machining steps are all performed in under 13 minutes.

17. The method according to claim 11, wherein alternate interior angles formed by said angular welded joint are 30° and 150° respectively.

18. In a method of forming seam-welded steel conduit from two lengths of steel flat stock which includes the step of joining the trailing end of a first such length to the leading end of a second such length, the improvement which comprises:
trimming said trailing end and said leading end at supplementary angles, one of such angles being an acute angle;
butting the trimmed ends together so that said ends engage to form an angular splice joint;
placing a separate piece of steel along each end of the angular splice joint;
welding the angular joint along and beyond each end of the angular joint onto the two pieces of steel; and
removing sufficient weldment from the welded joint to provide a weld which has substantially the identical thickness as the abutting lengths of flat stock and substantially the identical width as the abutting lengths of flat stock to provide a substantially smooth surface for uninterrupted fluid flow long the interior surface of the seam-welded conduit when fluid is transported in the conduit.

* * * * *

UNITED STATES PATENT AND TRADEMARK OFFICE
Certificate

Patent No. 4,863,091                                                      Patented: September 5, 1989

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: Jon D. Dubois and Lawrence W. Smith.

Signed and Sealed this Seventeenth day of October, 1995.

PAULA A. BRADLEY
*Supervisory Patent Examiner*
Art Unit 3205